US008680704B1

(12) United States Patent
Rooney

(10) Patent No.: US 8,680,704 B1
(45) Date of Patent: Mar. 25, 2014

(54) WELLHEAD PRESSURE REDUCTION AND ELECTRICAL POWER GENERATION

(75) Inventor: Christopher F. Rooney, Edmond, OK (US)

(73) Assignee: Taylor Valve Technology, Inc., Oklahoma City, OK (US)

( * ) Notice: Subject to any disclaimer, the term of this patent is extended or adjusted under 35 U.S.C. 154(b) by 628 days.

(21) Appl. No.: 12/885,055

(22) Filed: Sep. 17, 2010

Related U.S. Application Data

(60) Provisional application No. 61/243,945, filed on Sep. 18, 2009.

(51) Int. Cl.
*F03B 13/00* (2006.01)
*H02P 9/04* (2006.01)

(52) U.S. Cl.
USPC .......................................................... 290/54

(58) Field of Classification Search
USPC ................... 290/54, 43; 166/65.1, 66.4, 66.5; 175/57, 320
See application file for complete search history.

(56) References Cited

U.S. PATENT DOCUMENTS 3,076,096 A * 1/1963 Bachmann .................... 290/1 R
4,654,537 A 3/1987 Gaspard
4,809,510 A 3/1989 Gaspard et al.
5,052,941 A 10/1991 Hernandez-Marti et al.
5,149,984 A * 9/1992 Schultz et al. .................. 290/54
5,248,896 A 9/1993 Forrest
5,335,730 A 8/1994 Cotham, III
5,336,933 A * 8/1994 Ernster ........................... 290/55
5,969,429 A * 10/1999 Rudolph et al. ................ 290/54
7,775,299 B2 * 8/2010 Khan et al. ...................... 175/57
7,874,381 B2 * 1/2011 Shaw .............................. 175/57
2007/0017669 A1 * 1/2007 Lurie ......................... 166/177.4

* cited by examiner

*Primary Examiner* — Julio C. Gonzalez
(74) *Attorney, Agent, or Firm* — Hall Estill Attorneys at Law

(57) ABSTRACT

Apparatus and method for generating electrical power through the reduction of a wellhead pressure. In accordance with various embodiments, a wellhead coupled to a subterranean formation supplies a first conduit with pressurized natural gas at a first pressure. A turbine receives the pressurized natural gas and induces a pressure drop in the gas as the gas induces mechanical rotation of the turbine. A mechanical linkage is coupled to the turbine, and an electrical generator is coupled to the mechanical linkage. The electrical generator generates electrical power responsive to the mechanical rotation of the turbine. The turbine and the electrical generator are operated to maintain an exit pressure of the pressurized natural gas at a predetermined second pressure less than the first pressure.

20 Claims, 6 Drawing Sheets

WELLHEAD PRESSURE REDUCTION AND ELECTRICAL POWER GENERATION

RELATED APPLICATIONS

This application makes a claim of domestic priority under 35 U.S.C. §119(e) to U.S. Provisional Patent Application No. 61/243,945 filed Sep. 18, 2009, the contents of which are hereby incorporated by reference.

BACKGROUND

Natural gas is often extracted by a natural gas producer from a subterranean formation and transported to various end users through a pipeline distribution network. Because the end users of the natural gas may be located a great distance from the wellhead (source), it is common for main distribution line pressures to be on the order of about 1000 pounds per square inch (psi) or greater.

Local gas distribution companies often purchase natural gas from a natural gas producer. The local distribution companies take delivery of the natural gas from the main distribution lines and in turn distribute the gas to various residential and commercial consumers via a secondary, local network. The distributed gas may be at significantly reduced pressure levels, such as on the order of a few psi.

While main distribution line pressures may be around 1000 psi, the pressure of the extracted natural gas from a wellhead may be significantly greater, such as from 5,000 to 15,000 psi or even higher. It is common to use a pressure reducing mechanism, such as a choke, to reduce the wellhead pressure level (e.g., 10,000 psi) to a suitable main distribution line pressure level (e.g., 1000 psi). Because of Joule-Thompson cooling, the reduced pressure gas may undergo a significant drop in temperature, and liquid content (such as water) in the gas may freeze or otherwise impede the transfer of the natural gas into the distribution network.

A related issue with the extraction of natural gas is that wellsites are often provided in remote locations. It is common to extract natural gas from an undersea formation using a drilling platform located over a continental shelf (e.g., in the Gulf of Mexico), or in a rural area such as in the middle of a prairie or desert. In such cases, it may be difficult to obtain electrical power to service the needs of personnel and equipment located at or near the wellsite.

SUMMARY

Various embodiments of the present invention are generally directed to an apparatus and method for generating electrical power through the reduction of a wellhead pressure.

In accordance with various embodiments, a wellhead coupled to a subterranean formation supplies a first conduit with pressurized natural gas at a first pressure. A turbine receives the pressurized natural gas and induces a pressure drop in the gas as the gas induces mechanical rotation of the turbine. A mechanical linkage is coupled to the turbine, and an electrical generator is coupled to the mechanical linkage.

The electrical generator generates electrical power responsive to the mechanical rotation of the turbine. The turbine and the electrical generator are operated to maintain an exit pressure of the pressurized natural gas at a predetermined second pressure less than the first pressure.

These and other features of the various embodiments of the present invention can be understood from the following detailed description and the associated drawings.

DETAILED DESCRIPTION

The present disclosure is generally directed to an apparatus and method for reducing a wellhead pressure of natural gas extracted from a subterranean formation and for using this pressure reduction to generate electrical power adjacent the wellhead.

This provides a number of benefits including the ability to capture energy that would otherwise be wasted in reducing the extracted natural gas to a suitable level for transport via a main distribution pipeline network. In some embodiments, it is contemplated that sufficient electrical power can be captured to meet or exceed all of the loading requirements of facilities located adjacent the wellhead. In other embodiments, the generated electrical energy is transferred to a local electrical power distributor in a cogeneration arrangement.

Figure 1:
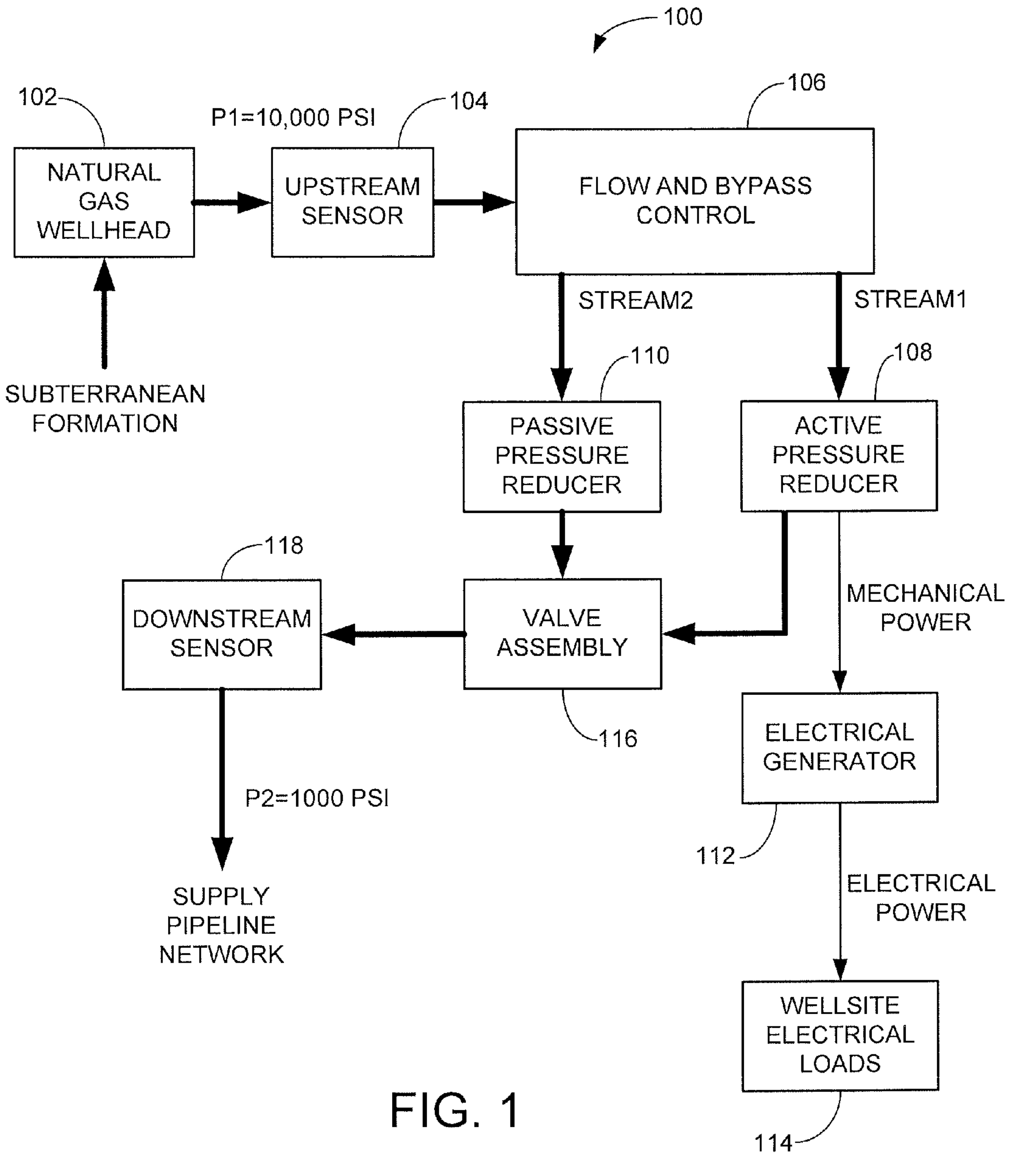
FIG. 1 is a functional block diagram of a wellhead pressure reducer and electrical power generation system constructed and operated in accordance with various embodiments of the present invention.

Turning now to the drawings, FIG. 1 shows a functional block diagram for a wellhead pressure reducer and electrical power generation system 100 in accordance with various embodiments. It is contemplated that the system may be located in a remote location, such as at sea on a drilling platform, or in a sparsely populated area on land (e.g., in a prairie, in a desert, etc.). As the various elements of the system 100 can take a number of configurations, functional blocks have been used in order to provide an overview of various aspects of the system.

Generally, the flow of natural gas through the system 100 from one block to the next is denoted by heavy arrowed lines. It will be appreciated that suitably sized conduits will be provided to direct the natural gas through the system.

A natural gas wellhead 102 is configured to allow the extraction of a supply of natural gas from a subterranean formation. It is contemplated that the extracted natural gas will be at an initial pressure P1, such as P1=10,000 psi. While the P1 pressure may vary over time, it is contemplated that this pressure will maintain a relatively constant, steady state value and will change relatively slowly as volumes of gas are removed from the formation.

A second, downstream pressure P2 represents the exit pressure for the system 100 as the fluid passes to a downstream pipeline network. In FIG. 1, the P2 pressure has an exemplary specified value of P2=1000 psi. In at least some embodiments, the system 100 operates with a primary emphasis on maintaining this P2 value at the specified level within predetermined tolerances (e.g., 1000 psi+/−5%). Other values, of course, can be specified as required.

An upstream sensor is denoted at 104, and constitutes a passive pressure sensor that monitors the P1 pressure of the inlet gas. A flow and bypass control module 106 operates to regulate the passage of the gas from the sensor 104 along two primary, parallel paths; a first stream (STREAM1) that passes through an active pressure reducer block 108, and a second stream (STREAM2) that passes through a passive pressure reducer block 110.

Each of these paths will be discussed in greater detail below. At this point it will be noted that the active pressure reducer 108 operates to convert the first stream flow to mechanical power, which in turn drives an electrical generator 112 to generate electrical power to service various loads 114.

In some embodiments, the passive pressure reducer 110 has a choke type design that serves to provide a controlled amount of pressure drop thereacross as fluid passes along the second stream. The respective amounts of fluid that pass through the first and second paths will be regulated by the flow and bypass control block 106. It is contemplated that at least under some operational conditions, respective portions of the pressurized gas may concurrently flow through each path.

Downstream of the active and passive pressure reducers 108, 110 is a valve assembly 116, which combines the parallel streams back into a single stream of pressurized gas. The valve assembly may include check valves and other features that ensure that the gas flows one way and not back into other parts of the system.

It is contemplated that the respective parallel streams will operate to provide the requisite pressure drop in the fluid to the P2 level. A downstream sensor 118 reports the instantaneous P2 pressure of the gas to the flow and bypass control block 106. Although not shown, other mechanisms may be provided downstream, including a separator stage useful in removing fluid components, heating the gas, etc. prior to introduction to the pipeline network.

In at least some embodiments, a significant issue with regard to ongoing operation of the system 100 is maintenance of the downstream P2 pressure within closely controlled, acceptable limits. This ensures that the gas is presented to the supply pipeline network at the appropriate exit pressure.

As part of the operation of reducing the pressure to the P2 level, electrical power can be advantageously generated for use by loads at the wellsite or other locations. It will be noted that the exemplary system 100 is configured to achieve the required amount of pressure reduction even in situations where the electrical generator 112 is off-line.

Figure 2:
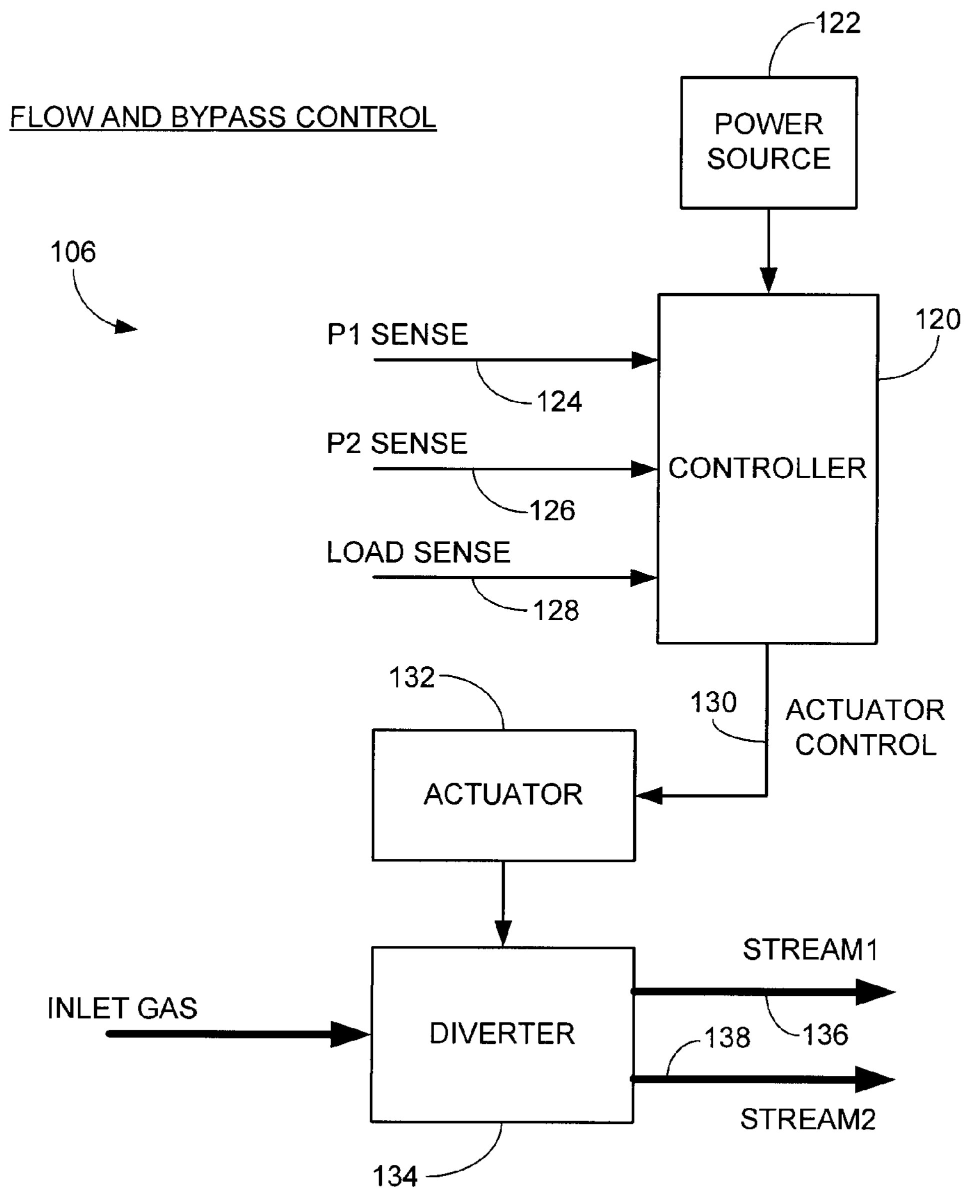
FIG. 2 illustrates the flow and bypass control block of FIG. 1 in accordance with some embodiments.

FIG. 2 shows a block diagram of the flow and bypass control block 106 of FIG. 1 in accordance with some embodiments. Top level control is provided by a controller 120, which may be characterized as a programmable microcontroller (such as a programmable logic controller, PLC). The controller 120 is powered by a power source 122, which may take a variety of configurations including a battery source, a connection to a separate electrical grid, or power from the electrical generator 112.

The controller receives a number of signal inputs that may be transferred via cabling or wireless communication paths from other portions of the system 100. Exemplary signals include a P1 sense signal provided on path 124 from the upstream sensor 104 indicative of P1 pressure sense measurements. A P2 sense signal is shown on path 126 from the downstream sensor 118 to indicate P2 pressure sense measurements. A load sense signal is provided on path 128 from the electrical generator 112 or other associated elements indicative of the amount of load (e.g., amps, kw, etc.) supplied by the electrical generator. It will be appreciated that any number and types of inputs can be supplied to the controller 120 as required.

The controller 120 can further be configured to output a variety of control signals to various elements of the system 100. Of interest is an exemplary output signal from the controller 120 identified in FIG. 2 as an actuator control signal on path 130, which is supplied to a mechanical actuator 132. The actuator 132 is coupled to a diverter mechanism 134 which receives the inlet gas from the wellhead 102 (FIG. 1) and diverts the gas along the respective first and second paths STREAM1 (path 136) and STREAM2 (path 138).

The diverter and actuator can take any number of suitable configurations, such as a linear mechanical actuator with a rack and pinion arrangement that rotates one or more chokes to divert the respective amounts of flow along the two paths 136, 138. In at least some embodiments, the diverter 134 can operate in selected increments of flow from 100% on path 136 and 0% on path 138, to 0% on path 136 and 100% on path 138, or any selected percentages on each path therebetween. Generally, it is contemplated that the controller 120 will adjust the diverter 134 to maintain the P2 pressure within the specified range in view of changes in operational conditions, such as changes in the magnitude of the wellsite electrical loads 114 (FIG. 1).

Figure 3:
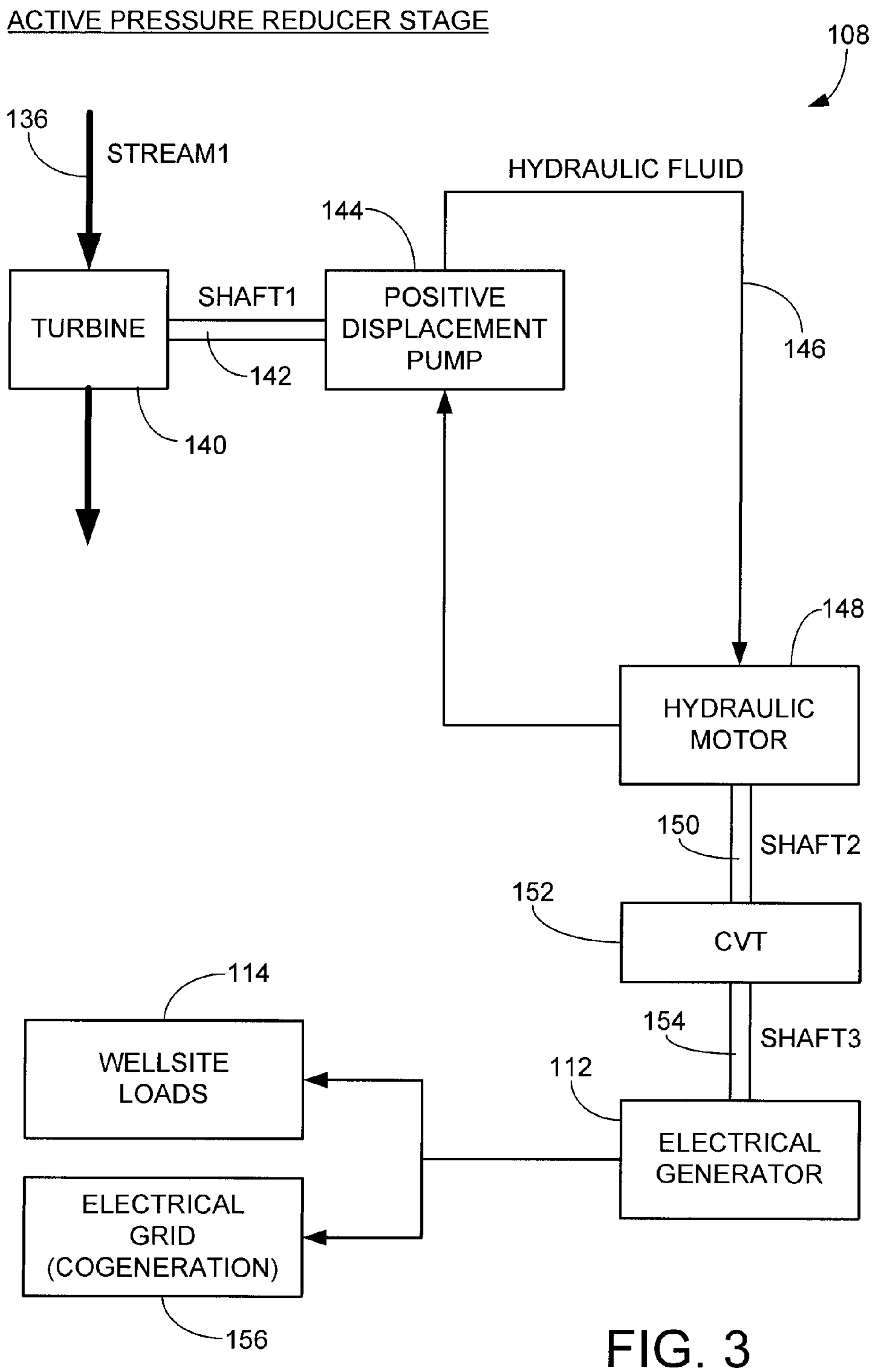
FIG. 3 illustrates the active pressure reducer stage of FIG. 1 in accordance with some embodiments.

FIG. 3 shows a block diagram arrangement of the active pressure reducer stage 108 of FIG. 1 in accordance with some embodiments. It will be appreciated that FIG. 3 is merely exemplary and a number of alternative configurations can readily be employed.

A turbine 140 or similar member receives the flow along STREAM1 (path 136) and uses this pressurized flow to generate mechanical rotation of a first shaft 142 (SHAFT1). The turbine 140 may be an inline design such as generally disclosed by U.S. Pat. No. 6,907,727 to Turchetta, or may take some other form. Generally, as will be recognized by those skilled in the art, the inlet fluid will impinge one or more vanes to induce the rotation of the shaft 142. It is contemplated that the natural gas will undergo a significant pressure reduction as the gas flows through the turbine 140.

The shaft 142 rotates a rotary positive displacement pump 144 or similar device to pump a working fluid, such as a hydraulic fluid, along a closed conduit path 146. Generally, the pump 144 will operate to displace a selected amount of the hydraulic fluid on each pump rotary cycle irrespective of the pressure of the fluid.

The pressurized hydraulic fluid is transported via the path 146 to a hydraulic motor 148, which rotates a second shaft 150 (SHAFT2) in relation to the pressure of the hydraulic fluid. The second shaft 150 engages one side of a continuously variable transmission (CVT) 152, which is configured to drive an output third shaft 154 (SHAFT3) at a nominally constant rotational rate. The CVT 152 can take a number of forms, such as disclosed by U.S. Pat. No. 7,063,640 to Miller.

The output third shaft 154 drives the electrical generator 112 of FIG. 1 to generate electrical power. The electrical power can be supplied to various wellsite loads 114, as previously illustrated in FIG. 1. Alternatively or additionally, if sufficient power is generated, the power may be supplied to a local electrical grid 156 in a cogeneration arrangement in which power generated by the system 100 is purchased by a local electricity provider as in the case of a windmill or other cogeneration mechanism.

Figure 4:
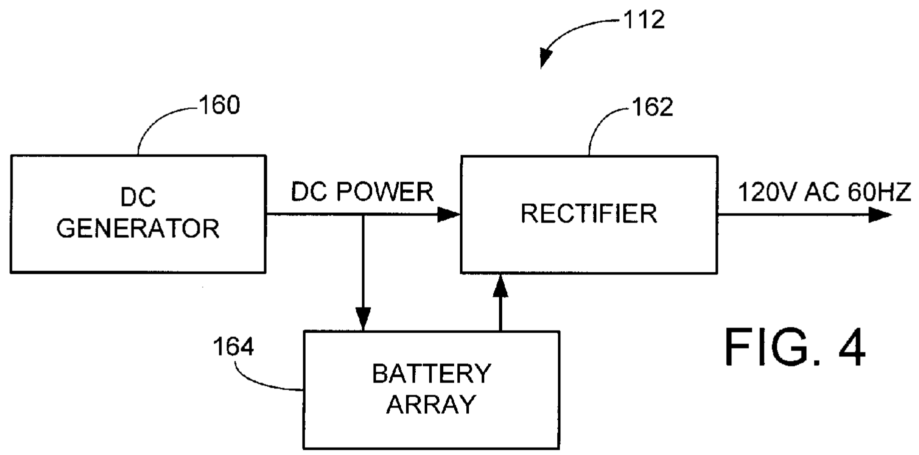
FIG. 4 sets forth an alternative configuration for the electrical generator of FIG. 1.

In some embodiments, the electrical generator 112 is a synchronous AC generator and generates alternating current power such as 120V, 60 Hz. In other embodiments, as illustrated in FIG. 4 a direct current (DC) generator 160 is used to generate DC power at a suitable voltage which is provided to a converter or inverter 162 for generation of AC power at the appropriate voltage and frequency. Use of a DC generator 160 also allows power to be temporarily stored in a battery array 164 for subsequent rectification at a later time.

This can be useful in circumstances where the power loading varies widely throughout each day, so that power can be generated and stored during low power loading times and then utilized to supplement ongoing power generation during high power loading times. The electrical generation portion of the system may be adapted from existing wind generation (windmill) systems.

Figure 5:
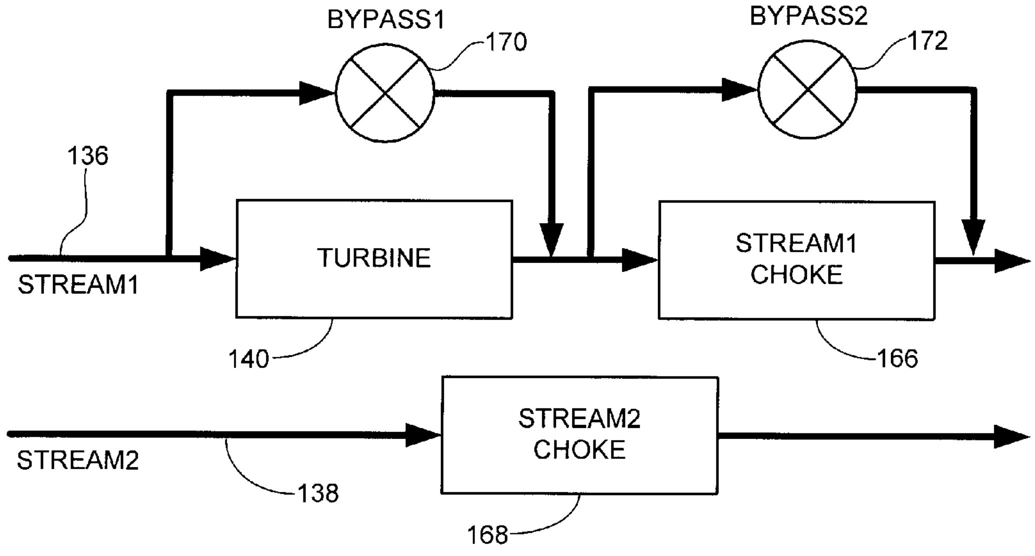
FIG. 5 shows another alternative embodiment for the respective streams of FIG. 1.

FIG. 5 shows an alternative arrangement for the respective STREAM1 and STREAM2 paths 136, 138. In FIG. 5, the turbine 140 of FIG. 3 can be placed in series along the STREAM1 path with a passive pressure reducer block, such as a choke 166. While the choke 166 is shown to be located downstream of the turbine 140, in alternative embodiments a choke may be located upstream of the turbine along the STREAM1 path. The STREAM2 path 138 is shown to include a second choke 168 in parallel with the turbine 140 and choke 166 of the STREAM1 path 136.

As desired, selectively operable bypass valves 170, 172 (BYPASS1 and BYPASS2) are further connected as shown. These valves may be operated by control signals supplied by the controller 120 in FIG. 2. During normal operation when the entirety of the flow of STREAM1 is desired to pass through both the turbine 140 and the first choke 166, the respective valves 170, 172 will remain closed. The turbine 140 can be bypassed, however, by opening the BYPASS1 valve 170, and the first choke 166 can be bypassed by opening the BYPASS2 valve 172. It will be appreciated that the bypass valving arrangements of FIG. 5 are merely exemplary. Various other arrangements can be used in this and other locations throughout the system 100.

The system 100 as exemplified herein provides a great deal of operational adaptability to meet a variety of different loading requirements. The closed loop operation of the controller 120 ensures that the downstream pressure P2 is maintained within closely monitored tolerances. In the event that large amounts of electrical power are desired to be generated, the controller 120 can configure the system such that most, if not substantially all, of the required pressure drop of the natural gas is extracted via the generation of such power; that is, the system will be configured such that the turbine constitutes the element across which most if not all of the pressure drop occurs.

It is contemplated that the extraction of mechanical energy to effect the pressure drop may result in Joule-Thompson cooling in the vicinity of the turbine as the reduced pressure gas undergoes a significant drop in temperature. Localized heating may be applied to reduce icing or other effects that may interfere with the ongoing operation of the turbine. Such heating may be powered from the electrical energy generated by the generator.

Other mechanical arrangements can readily be used than those shown in the figures. Hydraulic lines such as 146 are particularly useful in a wellsite due to the ability to route the lines without interfering with other ongoing operations. However, in alternative embodiments mechanical linkages, such as a power takeoff (PTO) shaft, can be used.

Figure 6:
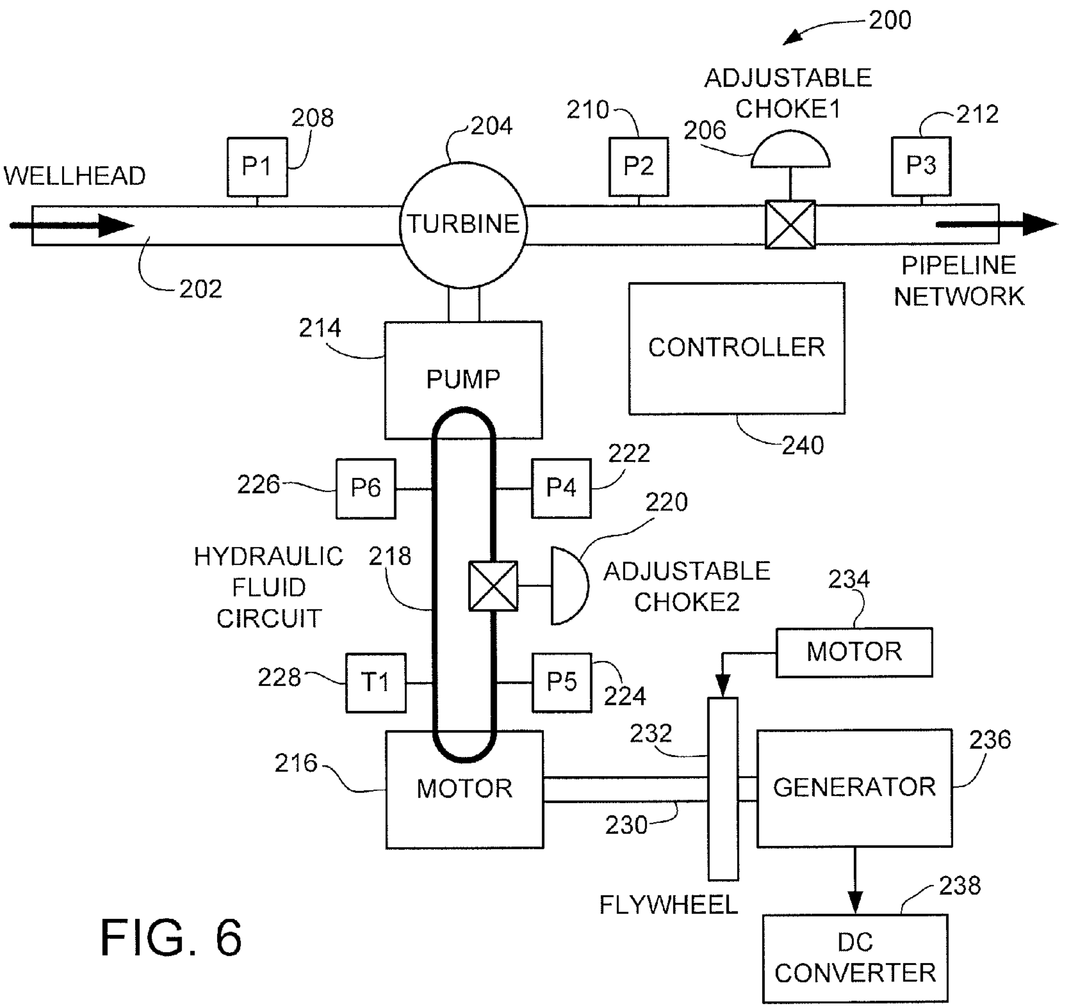
FIG. 6 provides an alternative block diagram for a wellhead pressure reducer and electrical power generation system.

FIG. 6 illustrates a block diagram for another alternative system 200 in accordance with various embodiments. The system 200 receives pressurized fluid, such as natural gas, from a wellhead via conduit 202. A turbine 204 operates in conjunction with an adjustable choke (choke 1) 206 to establish an appropriate downstream pressure level. Pressure sensors P1, P2 and P3 are provided at 208, 210 and 212. Although not shown, one or more by-pass paths can be established to reroute the fluid around the turbine while maintaining the requisite downstream pressure.

As before, the turbine 204 is mechanically coupled to a pump 214, which may be characterized as a hydraulic motor which circulates a volume of working fluid, such as hydraulic fluid, to a second hydraulic motor 216. As noted above, the use of hydraulic fluid as a mechanical transfer mechanism is merely illustrative and provides an advantage in that the electrical equipment can be located a safe distance away from the fluidic flow. Other forms of mechanical linkages are envisioned.

The hydraulic fluid is passed along a conduit 218 with an in-line adjustable choke (choke2), or regulator 220. The choke 220 provides selected restriction (resistance) to the fluidic flow. Increased resistance along the hydraulic fluid conduit will serve to apply mechanical loading to the turbine, and increased pressure drop in the fluid. Pressure sensors P4, P5 and P6 numerically denoted at 222, 224 and 226 sense the pressure of the hydraulic fluid at various points. A temperature sensor (T1) 228 provides a temperature measurement of the hydraulic fluid. Additional temperature sensors can be supplied throughout the system.

The second hydraulic motor 216 drives a shaft 230 at a selected rate in relation to volume displacement and/or pressure of the hydraulic fluid. The shaft 230 is coupled to a large mass flywheel 232, which may be engaged with a separate motor 234 (such as a small internal combustion engine or other source) to bring the flywheel to a selected rotational rate. Clutching mechanisms (not shown) can be implemented to selectively couple and decouple the flywheel from the pump 216.

The flywheel stores mechanical energy and helps to regulate shaft rotation rate. The flywheel is coupled to a generator 236 which operates as described above to generate electrical power. In FIG. 6, DC power is generated and converted by a DC converter 238 prior to transmission to a local load or distribution network.

The various sensing units in FIG. 6 are supplied to a top level controller 240, which monitors and operates the system 200. Various noncompliant states of the system can be detected through the various sensors. For example, a seized (non-rotating) turbine can be discerned from one or more of the sensors, allowing a bypass path to be manually or automatically established. Electrical loading can be metered and used to establish upstream settings (e.g., greater or lesser resistance applied by choke2 220, etc.).

One limitation with existing choke designs used to reduce pressure in pressurized fluids is wear; that is, embedded particulates, such as sand, can be carried along at high velocity by the pressurized fluid, and these particulates can strike various surfaces of the chokes (and other equipment surfaces) with high kinetic energy, resulting in wear and, ultimately, failure of the equipment. One way in which such particulates can be compensated for is to design the turbine blades such that the inlet pressurized fluid impinges the various fan blades at an oblique angle. Provision can also be provided such that the particulates are carried around and deposited in a trap or other location.

Figure 7:
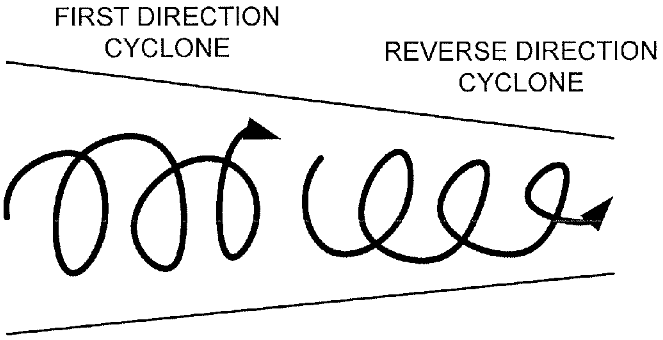
FIG. 7 diagrammatically represents the use of internally generated vortices to reduce particulates from the inlet fluidic flow.

Fluidic direction management can also be applied to the inlet fluidic flow. FIG. 7 provides a simplified illustration of a reverse cyclone arrangement whereby upstream fluidic flow is induced by diversion features to pass into one or more cyclones, or vortices, allowing particulates to accumulate and fall from the fluidic flow.

Figure 8:
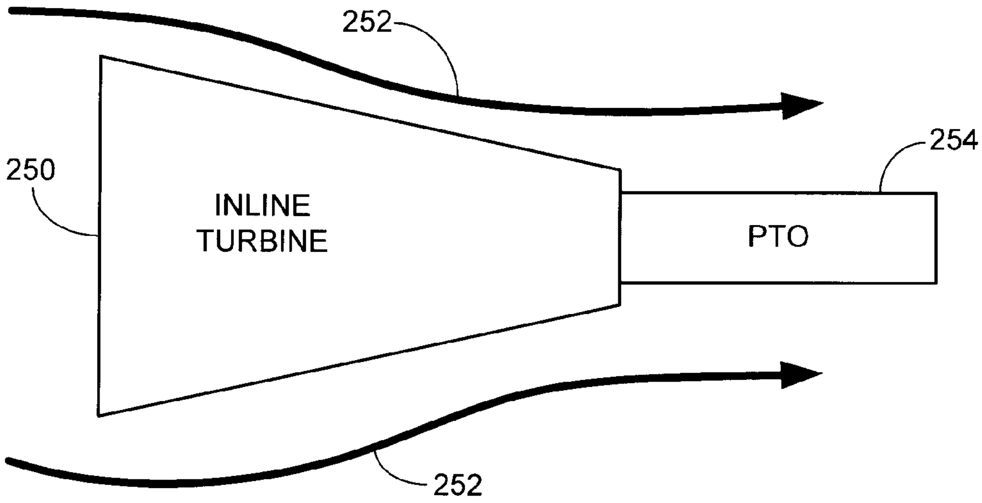
FIG. 8 illustrates the use of an in-line turbine in accordance with some embodiments.

FIG. 8 shows yet another orientation for a turbine 250, characterized as an inline turbine. Although not shown in detail, the turbine 250 may incorporate a number of blades that are impinged upon by the inlet fluid 252 as the fluid is directed around the turbine. This mechanical impingement results in a pressure reduction in the fluid as well as mechanical rotation of the turbine. The turbine 250 can be coupled to an in-line PTO or other mechanical linkage 254 around which the exiting fluid is directed.

Figure 9:
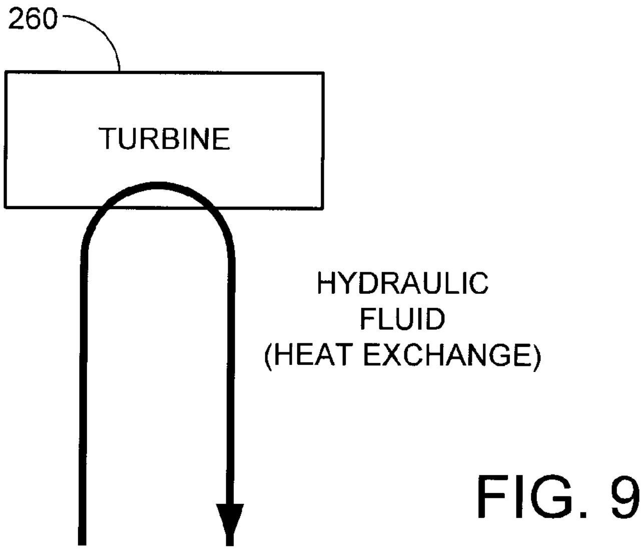
FIG. 9 shows how a portion of a working fluid, such as hydraulic fluid, may be used to reduce cooling of the turbine during operation.

FIG. 9 shows yet another illustrative example in which a portion of the hydraulic fluid is directed adjacent a turbine 260 via a jacket or other conduit arrangement. It is contemplated that during operation, depending on the system configuration and operational conditions a significant amount of heat may be transferred to the hydraulic fluid. Because it is further contemplated that the significant drop in pressure caused by the operation of the turbine may result in JT cooling effects, an efficient heat-exchange arrangement can be established by routing a portion of the hydraulic fluid adjacent the turbine. In this way, heat can be transferred from the fluid to the turbine to reduce icing and increase the efficiency of the pressure drop operation.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:

a wellhead coupled to a subterranean formation which supplies pressurized natural gas to a first conduit at a first pressure;

a turbine configured to receive the pressurized natural gas from the first conduit and to induce a pressure drop in the gas as the gas induces mechanical rotation of the turbine;

an electrical generator which generates electrical power responsive to the mechanical rotation of the turbine, wherein the turbine and the electrical generator maintain an exit pressure of the pressurized natural gas at a predetermined second pressure less than the first pressure; and a mechanical linkage between the turbine and the electrical generator, the mechanical linkage comprising a first hydraulic motor coupled to the turbine, a second hydraulic motor coupled to the electrical generator, and a closed conduit which accommodates a volume of pressurized hydraulic fluid, wherein the first hydraulic motor rotates responsive to mechanical rotation of the turbine to initiate a flow of the pressurized hydraulic fluid, the flow of pressurized hydraulic fluid initiating rotation of the second hydraulic motor, and the rotation of the second hydraulic motor initiating rotation of the electrical generator.

2. The apparatus of claim 1, further comprising a choke connected in series and downstream from the turbine which cooperates with the turbine to reduce the pressure of said natural gas to the second pressure.

3. The apparatus of claim 1, further comprising a choke connected in parallel with the turbine which cooperates with the turbine to reduce the pressure of said natural gas to the second pressure.

4. The apparatus of claim 1, further comprising a bypass path for the pressurized natural gas so that the pressurized natural gas temporarily bypasses the turbine while the turbine is offline, the bypass path including a choke which operates to reduce the pressurized natural gas to the second pressure.

5. The apparatus of claim 1, further comprising a first pressure sensor which generates a first pressure measurement signal indicative of the first pressure, and a second pressure sensor which generates a second pressure measurement signal indicative of the second pressure.

6. The apparatus of claim 5, further comprising a programmable controller which, responsive to the first and second pressure measurement signals, adjusts a system parameter to maintain the second pressure at said predetermined level.

7. The apparatus of claim 1, further comprising a direct-current (DC) to alternating-current (AC) converter, wherein the electrical generator generates DC electrical power which is rectified to AC electrical power by the converter.

8. The apparatus of claim 1, further comprising a battery adjacent the generator which temporarily stores said power generated by the electrical generator.

9. The apparatus of claim 1, further comprising an electrical heater adjacent the turbine to supply heat to the turbine during operation, the electrical heater generating said heat from electrical power generated by the electrical generator.

10. A method comprising:

receiving pressurized natural gas from a subterranean formation via a wellhead conduit which supplies said gas at a wellhead pressure;

directing the gas through a turbine to induce a pressure drop in the gas and to induce mechanical rotation of the turbine; and using an electrical generator coupled to the turbine via a mechanical linkage to generate electrical power responsive to said mechanical rotation of the turbine, wherein the turbine and the electrical generator maintain the gas at a predetermined exit pressure less than the wellhead pressure, wherein the mechanical linkage comprises a first hydraulic motor coupled to the turbine, a second hydraulic motor coupled to the electrical generator, and a closed conduit which accommodates a volume of pressurized hydraulic fluid, wherein the first hydraulic motor rotates responsive to mechanical rotation of the turbine to initiate a flow of the pressurized hydraulic fluid, wherein the flow of pressurized hydraulic fluid initiates rotation of the second hydraulic motor, and wherein the rotation of the second hydraulic motor initiates rotation of the electrical generator.

11. The method of claim 10, wherein the directing step further comprises directing the gas through a choke connected in series with the turbine to reduce the pressure of said natural gas to the exit pressure.

12. The method of claim 10, further comprising using a first pressure sensor to sense the wellhead pressure of the gas and a second pressure sensor to sense the exit pressure of the gas.

13. The method of claim 12, further comprising utilizing a programmable controller to adjust a system parameter to maintain the exit pressure at a predetermined level responsive to the first and second pressure sensors.

14. The method of claim 10, in which the electrical generator generates direct current (DC) electrical power, and the method further comprises converting the DC electrical power to produce alternating current (AC) power.

15. The method of claim 10, further comprising temporarily storing the electrical power generated by the electrical generator in a battery.

16. The method of claim 10, further comprising using an electrical heater adjacent the turbine to supply heat to the turbine during operation, the electrical heater generating said heat from electrical power generated by the electrical generator.

17. An apparatus comprising:

a turbine which mechanically rotates in response to a flow of pressurized natural gas from a conduit connected to a natural gas wellhead;

a mechanical linkage comprising a first hydraulic motor connected to the turbine, a second hydraulic motor and a closed conduit connected between the first and second hydraulic motors, the closed conduit accommodating a volume of pressurized hydraulic fluid; and an electrical generator connected to the second hydraulic motor, wherein the first hydraulic motor rotates responsive to mechanical rotation of the turbine to initiate a flow of the pressurized hydraulic fluid, the flow of pressurized hydraulic fluid initiating rotation of the second hydraulic motor, and the rotation of the second hydraulic motor initiating rotation of the electrical generator to generate electrical power.

18. The apparatus of claim 17, wherein rotation of the turbine induces a first pressure drop in the flow of natural gas, and wherein the apparatus further comprises a choke connected to the turbine to induce a second pressure drop in the flow of natural gas.

19. The apparatus of claim 18, wherein the flow of natural gas is at a pressure of from 5,000 pounds per square inch (psi) to 15,000 psi.

20. The apparatus of claim 17, further comprising an electrical heater adjacent the turbine to supply heat to the turbine during operation, the electrical heater generating said heat from electrical power generated by the electrical generator.

* * * * *

UNITED STATES PATENT AND TRADEMARK OFFICE

CERTIFICATE OF CORRECTION

PATENT NO. : 8,680,704 B1
APPLICATION NO. : 12/885055
DATED : March 25, 2014
INVENTOR(S) : Christopher F. Rooney It is certified that error appears in the above-identified patent and that said Letters Patent is hereby corrected as shown below:

In the Title Page:

Item (73) Assignee:
replace “Taylor Valve Technology, Inc.”
with “Taylor Innovations, L.L.C.”

Signed and Sealed this
Twenty-second Day of July, 2014

Michelle K. Lee

Michelle K. Lee
*Deputy Director of the United States Patent and Trademark Office*